United States Patent [19]

Venkataswamy

[11] Patent Number: 5,574,105

[45] Date of Patent: Nov. 12, 1996

[54] THERMOPLASTIC ELASTOMERS HAVING IMPROVED HIGH TEMPERATURE PERFORMANCE

[75] Inventor: Krishna Venkataswamy, Akron, Ohio

[73] Assignee: Advanced Elastomer Systems, L.P., Akron, Ohio

[21] Appl. No.: 439,738

[22] Filed: May 12, 1995

[51] Int. Cl.⁶ ................ C08F 8/00; C08F 8/42; C08L 77/04

[52] U.S. Cl. ............ 525/179; 525/183; 525/66; 525/184; 525/176; 525/240

[58] Field of Search .................. 525/179, 183, 525/66, 184, 176, 240

[56] References Cited

U.S. PATENT DOCUMENTS

| | | | |
|---|---|---|---|
| 4,305,865 | 12/1981 | Okada | 525/183 X |
| 4,966,940 | 10/1990 | Tsuji et al. | 525/66 |
| 5,003,003 | 3/1991 | Olivier | 525/66 |
| 5,006,601 | 4/1991 | Lutz et al. | 525/66 |
| 5,091,469 | 2/1992 | Miller et al. | 525/65 |
| 5,122,569 | 6/1992 | Scheibelhoffer et al. | 525/66 |
| 5,140,059 | 8/1992 | Simoens | 524/504 |
| 5,162,445 | 11/1992 | Powers et al. | 525/333.4 |
| 5,212,238 | 5/1993 | Scheibelhoffer et al. | 525/66 |
| 5,234,993 | 8/1993 | Huynh-Ba | 525/66 |
| 5,238,990 | 8/1993 | Yu et al. | 524/504 |
| 5,244,961 | 9/1993 | Yu et al. | 524/514 |
| 5,453,465 | 9/1995 | Yu | 525/179 |

FOREIGN PATENT DOCUMENTS 92-02582  2/1992  WIPO.

OTHER PUBLICATIONS

Ide, et al. "Studies of Polymer Blends of Nylon 6 and Polypropylene", J. of Appl. Polym. Sci. 18, 1974, pp. 963–974.

Yu et al, "Modification Of Polyamide-6 With Brominated Isobutylene Para-Methylstyrene Elastomer" S.P.E. Antec '92 Proceedings, pp. 2385–2390 (1992).

*Primary Examiner*—Irina Zemel
*Attorney, Agent, or Firm*—William A. Skinner

[57] ABSTRACT

A thermoplastic elastomer comprising a triblend of engineering resin, dynamically vulcanized alloy of thermoplastic olefin polymer and elastomeric copolymer, and a compatibilizer for the engineering resin and alloy. The compositions retain structural integrity at high temperature, and have good tensile properties, elongation and fluid resistance.

17 Claims, No Drawings

THERMOPLASTIC ELASTOMERS HAVING IMPROVED HIGH TEMPERATURE PERFORMANCE

BACKGROUND OF THE INVENTION

1. Field of the Invention

This invention relates to thermoplastic elastomers based on engineering thermoplastics, and which have improved high temperature performance while retaining excellent elongation characteristics. A thermoplastic elastomer is generally defined as a polymer or blend of polymers that can be processed and recycled in the same way as a conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

2. Description of the Related Art

Polymer blends which have a combination of both thermoplastic and elastic properties are generally obtained by combining a thermoplastic with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a micro-gel dispersion of cured elastomer, such as butyl rubber, chlorinated butyl rubber, polybutadiene or polyisobutene in an uncured matrix of thermoplastic polymer such as polypropylene.

U.S. Pat. No. 5,003,003 is directed to blends of polyamide resin with elastomeric ethylene-propylene polymers which have been functionalized, then crosslinked after dispersion in the polyamide resin. The resulting blend has improved tensile strength, elongation and oil resistance.

PCT Published Application WO 92/02582 describes blends of thermoplastic engineering resin with an elastomeric halogen-containing copolymer of a $C_{4-7}$ isomonoolefin and a para-alkylstyrene. The elastomer component of the blend may be cured or uncured.

U.S. Pat. No. 5,238,990 discloses a thermoplastic blend of polyamide with a grafted polymer which is a reaction product of (a) a copolymer or halogen-containing copolymer of a $C_{4-7}$ isomonoolefin and an alkylstyrene, and (b) an unsaturated carboxylic acid or a derivative thereof. The blend is said to have improved impact strength while maintaining the high flexural modulus of the polyamide.

In U.S. Pat. No. 5,244,961, a process is described for the preparation of a blend of thermoplastic polyamide and halogen-containing copolymer of $C_{4-7}$ isomonoolefin and paraalkylstyrene, in the presence of a metal compound. The blend has improved impact resistance at low temperatures.

SUMMARY OF THE INVENTION

The present invention is based on the discovery that a thermoplastic elastomer composition having excellent physical properties at elevated temperatures is provided by blending (a) a thermoplastic engineering resin with (b) a dynamically vulcanized alloy (DVA) comprising a thermoplastic olefinic polymer and an olefinic elastomer having reactive cure sites, in the presence of (c) a compatibilizer for the engineering resin and the DVA.

The compositions retain their structural integrity at high temperature, and have good tensile properties, elongation and fluid resistance. They have utility in applications where performance at elevated temperature is important, such as automobile under-hood parts.

DESCRIPTION OF THE PREFERRED EMBODIMENTS

Engineering Resin

The thermoplastic engineering resins used in the compositions of the invention are amorphous or semicrystalline materials, usually polar in nature, with a glass transition temperature (Tg) or melting point above about 150° C., preferably above about 200° C. They may be used singly or in combination, and are selected from polyamides, polycarbonates, polyesters, polysulfones, polylactones, polyacetals, acrylonitrile-butadiene-styrene (ABS) resins, polyphenylene oxide (PPO), polyphenylene sulfide (PPS), styrene-acrylonitrile (SAN) resins, polyimides, styrene maleic anhydride (SMA) and aromatic polyketones. Preferred thermoplastic engineering resins are polyamides. The more preferred polyamides are nylon 6, nylon 6,6, nylon 11, nylon 12 and mixtures or copolymers thereof.

Suitable thermoplastic polyamides (nylons) include crystalline or resinous, high molecular weight solid polymers (including copolymers and terpolymers) having recurring amide units within the polymer chain. Polyamides may be prepared by polymerization of one or more epsilon lactams such as caprolactam, pyrrolidone, lauryllactam and aminoundecanoic lactam, or amino acid, or by condensation of dibasic acids and diamines. Both fiber-forming and molding grade nylons are suitable. Examples of such polyamides are polycaprolactam (nylon 6), polylauryllactam (nylon 12), polyhexamethylenedipamide (nylon 6,6), polyhexamethyleneazelamide (nylon 6,9), polyhexamethylenesebacamide (nylon 6,10), polyhexamethyleneisophthalamide (nylon 6,IP) and the condensation product of 11-aminoundecanoic acid (nylon 11). Additional examples of satisfactory polyamides (especially those having a softening point below 275° C.) are described in Kirk-Othmer, Encyclopedia of Chemical Technology, 3d edition, vol. 18, pages 406–409, and Encyclopedia of Polymer Science and Engineering, 2d edition, vol. 11, pages 445–450. Commercially available thermoplastic polyamides may be advantageously used in the practice of this invention, with linear crystalline polyamides having a softening point or melting point between 160° and 230° C. being preferred.

The amount of engineering resin found to provide useful compositions is generally from about 10 to about 50 parts by weight, and more preferably from about 10 to about 40 parts by weight, based on the weight of the composition comprising engineering resin, DVA and compatibilizer.

Dynamically Vulcanized Alloy

The DVA component of the composition comprises a thermoplastic olefinic polymer and an elastomer (rubber) which have been melt blended in the presence of a curative to dynamically vulcanize the elastomer. The resulting DVA is a polyolefin matrix having micron or submicron size elastomer particles dispersed therein. The elastomer is desirably at least partially cured (crosslinked) during the dynamic vulcanization, and preferably is fully or completely cured.

As used in the specification and claims, the term "dynamic vulcanization" means a process wherein the elastomer is vulcanized or cured in the presence of the polyolefin under conditions of high shear and at a temperature above the melting point of the polyolefin. The elastomer is thus simultaneously crosslinked and is usually dispersed as fine particles within the polyolefin, although co-continuous phase morphologies or a mixture of discrete and co-continuous phase morphologies are also possible. Dynamic vulcanization is effected by mixing the components at elevated temperature in conventional mixing equipment such as roll mills, Banbury mixers, Brabender mixers, continuous mixers, mixing extruders and the like. The unique characteristic of dynamically cured compositions is that, notwithstanding the fact that the elastomer component is partially or fully cured, the compositions can be processed and reprocessed by conventional plastic processing techniques such as extrusion, injection molding and compression molding. Scrap or flashing can be salvaged and reprocessed.

The terms "fully vulcanized" and "completely vulcanized" as used in the specification and claims means that the elastomer component to be vulcanized has been cured to a state in which the elastomeric properties of the crosslinked rubber are similar to those of the elastomer in its conventional vulcanized state, apart from the thermoplastic elastomer composition. Simply stated, fully vulcanized means that substantially all of the rubber component which is capable of being vulcanized, has been vulcanized. The degree of cure can be described in terms of gel content or, conversely, extractable components. Alternatively the degree of cure may be expressed in terms of crosslink density. All of these descriptions are well known in the art, for example in U.S. Pat. Nos. 5,100,947 and 5,157,081, both of which are fully incorporated herein by this reference.

The amount of DVA found useful in the present compositions is generally from about 90 to about 50 parts by weight, and more preferably from about 90 to about 60 parts by weight, based on the weight of the composition comprising engineering resin, DVA and compatibilizer.

Thermoplastic Olefin Polymer

Polyolefins suitable for use in the compositions of the invention include non-polar thermoplastic, crystalline or semi-crystalline polyolefin homopolymers and copolymers. They are prepared from monoolefin monomers having 2 to 6 carbon atoms, such as ethylene, propylene, 1-butene, isobutylene, 1-pentene and the like, with ethylene, propylene and mixtures thereof being preferred. The polyethylene can be low density, ultra-low density or high density material. The term polypropylene includes homopolymers of propylene as well as reactor copolymers of polypropylene which can contain about 1 to about 20 weight percent of ethylene or an $\alpha$-olefin comonomer of 4 to 16 carbon atoms, and mixtures thereof. The polypropylene can be isotactic or syndiotactic, usually having a narrow range of Tg. Commercially available polyolefins may be used in the practice of the invention.

The amount of polyolefin found to provide useful DVA compositions is generally from about 10 to about 90 weight percent, based on the weight of the polyolefin and elastomer. Preferably, the polyolefin content will range from about 10 to about 50 percent by weight.

Curable Elastomer

Elastomers suitable for use in the compositions of the invention are compatible with the thermoplastic olefin polymer and have reactive cure sites. Such cure sites can either be an integral part of the elastomer backbone or can be incorporated by the addition of functional groups. A preferred group of elastomers is that prepared from copolymers of $C_{4-7}$ isoolefins and para-alkylstyrene. These copolymers are more fully described in U.S. Pat. No. 5,162,445, the disclosure of which is incorporated herein by this reference. A particularly preferred elastomer species is represented by the halogenated copolymer of isobutylene and para-methylstyrene. Elastomers of ethylene-propylene (EPR) and poly-(ethylene-co-propylene-co-diene), also known as EPDM rubber, have also been shown to perform well in the compositions, either alone or in combination with copolymers of isoolefins and para-alkylstyrene.

The amount of olefinic elastomer useful in the DVA compositions is generally from about 90 to about 10 weight percent, based on the weight of the polyolefin and elastomer. Preferably, the elastomer content will range from about 90 to about 50 percent by weight.

Curing System

In the compositions of the invention, the elastomer component of the DVA will generally be at least partially vulcanized, or crosslinked. Those ordinarily skilled in the art will appreciate the appropriate quantities, types of cure systems and vulcanization conditions required to carry out the vulcanization of the rubber. The elastomer can be vulcanized using varying amounts of curative, varying temperatures and varying time of cure in order to obtain the optimum crosslinking desired. Any known cure system can be used, so long as it is suitable under the vulcanization conditions for the elastomer or combination of elastomers being used and is compatible with the thermoplastic polyolefin component of the DVA. These curatives include sulfur, sulfur donors, metal oxides, resin systems, maleimides, peroxide-based systems, high energy radiation and the like, both with and without accelerators and co-agents. Phenolic resin curatives are preferred for the preparation of the DVA compositions of the invention, and such cure systems are well known in the art and literature of vulcanization of elastomers. Their use in DVA compositions is more fully described in U.S. Pat. No. 4,311,628, the disclosure of which is fully incorporated herein by this reference.

Compatibilizing Agent

The engineering resin and dynamically vulcanized alloy of the composition are combined in the presence of a compatibilizer for these components. Absent the compatibilizer, blends of engineering resin and DVA have poor mechanical and elongation properties, due to the lack of interfacial adhesion-between the components. Under stress, the weak interfaces may fail and the components delaminate. The addition of an interfacially active compatibilizer overcomes this deficiency. The compatibilizer is designed so that each segment or functional group is compatible with one of the major component phases, and incompatible with the other. The compatibilizer improves interfacial adhesion by connecting the component phases, forming a stable blend.

The compatibilizer can be formed by the direct interaction of segments containing the functional groups present in the major components, i.e. the engineering resin and the DVA, or by interaction with another bi- or multi-functional compound. Compatibilizers are known in the art, e.g. in U.S. Pat. No. 4,555,546 and *Journal of Macromolecular Science Chemistry*, A26 (8), 1211 (1989). Preferred compatibilizers include the reaction product of nylon and functionalized polypropylene, prepared by melt mixing nylon 6 with polypropylene grafted with 0.1–2.0 wt. percent maleic anhydride, in a ratio of nylon:maleated polypropylene ranging from 95:5 to 50:50. See *J. Appl. Polym. Sci.*, 18, 963 (1974) and *Eur. Polym. J.*, 26, 131 (1990).

The compatibilizer may be present in the compositions of the invention in the range of about 2 to about 35 parts by weight based on the engineering resin, DVA and compatibilizer. Preferably it is present in the range of about 2 to about 20 parts by weight.

Additives

In addition to the engineering resin, DVA and compatibilizing agent, the compositions of the invention may also include reinforcing and non-reinforcing fillers, plasticizers for the engineering resin and polyolefin, antioxidants, stabilizers, rubber processing oil, extender oils, lubricants, antiblocking agents, antistatic agents, waxes, foaming agents, pigments, flame retardants and other processing aids known in the rubber compounding art. The additives can be added during the preparation of the DVA or the preparation of the finished composition or both, provided that the total amount of the additives does not exceed about 50 weight percent, preferably about 25 weight percent, based on the total thermoplastic elastomer composition, including additives.

Fillers and extenders which can be utilized include conventional inorganics such as calcium carbonate, clays, silica, talc, titanium dioxide, carbon black and the like. The rubber processing oils are generally paraffinic, napthenic or aromatic oils derived from petroleum fractions. The type will be that ordinarily used in conjunction with the specific elastomer or elastomers present in the DVA, and the quantity based on the total rubber content may range from zero to a few hundred parts per hundred parts rubber (phr).

General Procedure

The general procedure for preparation of the compositions of the invention has two stages. In the first stage, a rubber having reactive curesite functionality is dynamically vulcanized in the presence of an olefinic thermoplastic which is inert to the rubber curesites, using appropriate curing systems. In the second stage, this dynamically vulcanized rubber/plastic alloy (DVA) is blended with an engineering resin in the presence of a compatibilizing agent. The two stages can be carried out independently in separate steps or sequentially in the same processing equipment.

More specifically, the DVA is prepared by blending the thermoplastic olefinic polymer, the elastomeric copolymer and zinc oxide in a Brabender mixer of 60 cc capacity at a temperature of about 180° C. The speed of the mixer is in the range of about 60 to about 200 rpm. After the components are well dispersed the curative system is added to initiate dynamic vulcanization. Mixing is continued until a maximum of mixing torque indicates that vulcanization has occurred, usually between one and five minutes, then the speed of the mixer is increased to maximum and mastication is continued for an additional two to three minutes. The vulcanized composition is removed from the mixer, cold pressed, and then is returned to the mixer for an additional one to two minutes of mixing at 180° C and 100 rpm.

The compatibilizer is prepared separately by melt mixing the components, for example nylon and maleated polypropylene, in a Brabender plasticorder. The components are added to the mixer bowl at about 20 rpm, and when the bowl is filled the mixing speed is increased to about 200 rpm. The temperature is increased to about 220°–225° C., and the mixing speed is then reduced to about 100 rpm. The torque of the mixer is monitored to determine completion of the end group reaction. When the reaction is complete, the compatibilizer composition is removed from the mixer and cold pressed.

In the final step, the engineering resin, DVA and compatibilizer are blended at high shear in a Brabender mixer. The temperature is increased to about 225° C. and the speed to about 200 rpm. After the materials melt, mixing is continued until the stock temperature reaches about 235° C. The speed is then reduced to about 100 rpm and mastication continued for two to three minutes. The stock is removed from the mixer, cold pressed, then returned to the mixer for an additional two minutes of mixing at 225° C. and 100 rpm. The composition is removed from the mixer and compression molded at about 240° C. into plaques of about 2 mm thickness for physical testing.

The following examples serve to illustrate-but not limit the present invention.

EXAMPLE 1

Following the general procedure outlined above, dynamically vulcanized alloys of polypropylene and an elastomer comprising a brominated copolymer of isobutylene and paramethylstyrene were prepared. The polypropylene, elastomer and curative were melt mixed in a heated Brabender mixer of 60 cc capacity at 100 rpm. The mix was masticated at a temperature in the range of 180 to 190° C. to dynamically vulcanize the rubber. Mixing was continued for about two minutes, or until the cure was complete (as indicated by a rapid increase in torque of the mixer). Mixing was then continued for about two minutes, or until the torque became relatively constant. The composition was removed from the mixer, sheets were compression molded at 190° C. and the physical properties were measured. Representative DVA compositions and their physical properties are set forth in Table I.

TABLE 1

| | #1 | #2 |
|---|---|---|
| Polypropylene[1] (parts/100 parts rubber)(phr) | 33.3 | 66.6 |
| Elastomer[2] | 100 | 100 |
| Zinc oxide | 2 | 2 |
| Curative[3] | 7.5 | 7.5 |
| Hardness (Shore) | 78A | 44D |
| Tensile strength (psi) | 1920 | 3310 |
| Elongation (%) | 350 | 530 |
| Modulus 100% (psi) | 765 | 1740 |
| Tension set (%) | 14 | 40 |
| Oil swell (%) - 22 hr/125° C., No. 3 oil | 168 | 110 |
| Compression set (%) - 22 hr/125° C. | 22 | 60 |

[1]PP D0008 (Aristech Chemical)
[2]brominated isobutylene/p-methylstyrene copolymer (Exxpro ™ elastomer, Exxon Chemical)
[3]dimethylol-p-octyl phenol (nonhalogenated)

The physical properties of the compositions were determined according to the following methods:

Tensile strength, elongation, modulus 100% and tension set—ASTM D412

Oil swell—ASTM D471

Compression set—ASTM D395B

The DVA compositions of this Example were incorporated into the blends of the invention according to the following examples.

EXAMPLE 2

Compositions of the invention were prepared by the procedure described above. Compositions A and B are comparative examples wherein blends of engineering resin/ elastomer and engineering resin/DVA were evaluated without the compatibilizer component. Compositions C-E represent the triblend compositions of the invention, including the compatibilizer. Physical properties were compared and are set forth in Table II.

Concentrations of the components are in the proportions expressed in the Table.

TABLE II

|  | A | B | C | D | E |
|---|---|---|---|---|---|
| Nylon 6[1] | 104.7 | 50 | 25 | 25 | 25 |
| DVA[2] | — | 100 | 100 | 100 | 100 |
| Compatibilizer 1[3] | — | — | 25 | 25 | — |
| Compatibilizer 2[4] | — | — | — | — | 25 |
| Elastomer[5] | 100 | — | — | — | — |
| Zinc Oxide | 2 | — | — | — | — |
| Curative[6] | 7.5 | — | — | — | — |
| Plasticizer[7] | — | — | — | 8 | — |
| Hardness (Shore D) | 50 | 43 | 44 | 39 | 44 |
| Tensile strength (psi) | 1790 | 1550 | 2580 | 2250 | 2680 |
| Elongation (%) | 10 | 120 | 230 | 360 | 230 |
| Modulus 100% (psi) | — | 1550 | 1980 | 1440 | 2060 |
| Tension set (%) | — | Fail | 46 | 38 | 47 |
| Oil swell (%) | 24 | — | 83 | 80 | 69 |
| Compression set (%) | 80 | — | 61 | 61 | 61 |

[1]Capron ® 8202 (Allied Signal)
[2]DVA #1 from Example 1
[3]60/40 interpolymer of Nylon 6/Polybond ® maleic anhydride modified polypropylene (Uniroyal Chemical Co.)
[4]80/20 interpolymer of Nylon 6/Polybond ® maleic anhydride modified polypropylene (Uniroyal Chemical Co.)
[5]brominated isobutylene/p-methylstryene copolymer (Exxpro ™ Exxon Chemical)
[6]dimethylol-p-octyl phenol (nonhalogenated)
[7]Ketjenflex ® 8 (Akzo Chemie)

As can be seen from the data in Table II, the compositions of the invention (C, D and E) have improved tensile strength and elongation properties at ambient temperature. In a further test tensile properties, and particularly elongation properties, were found to be retained at temperatures up to 165° C. as shown by the data for Composition E set forth in Table IIA.

TABLE IIA

| Temperature | 100° C. | 150° C. | 160° C. |
|---|---|---|---|
| Tensile strength (psi) | 1615 | 880 | 530 |
| Elongation (%) | 280 | 275 | 215 |
| Modulus 100% (psi) | 920 | 500 | 345 |

The addition of antioxidants can further improve the heat aging properties of the compositions of the invention. A composition of nylon 6 (25 parts by weight), compatibilizer 2 (25 parts) and DVA #1 (100 parts) was prepared as described above, and the following additives were included: magnesium oxide (1.25 parts); 2-mercaptotolylimidazole (2 parts); bis (2,4-di-t-butylphenyl) pentaerythritol diphosphite (1 part); and tris (3,5-di-tert butyl-4-hydroxybenzyl) isocyanurate (0.5 part). Physical properties were determined immediately after preparation and again after hot air aging at 150° C. for 168 and 336 hours. The results are shown in Table IIB.

TABLE IIB

| Heat aging (hours) | 0 | 168 | 336 |
|---|---|---|---|
| Tensile strength (psi) | 2580 | 2400 | 2080 |
| Elongation (%) | 220 | 150 | 120 |
| Modulus 100% (psi) | 2070 | 2100 | 1985 |

EXAMPLE 3

The effect of compatibilizer level was studied in compositions of the invention. Composition F represents a comparative example containing no compatibilizer, while compositions G-I contain compatibilizer over a range of concentrations. Physical properties were compared and are set forth in Table III.

TABLE III

|  | F | G | H | I |
|---|---|---|---|---|
| Nylon 6[1] (grams) | 20 | 17.2 | 14.4 | 11.6 |
| DVA[2] (grams) | 40 | 40 | 40 | 40 |
| Compatibilizer 2[3] (grams) | 0 | 2.8 | 5.6 | 8.4 |
| Hardness (Shore D) | 43 | 45 | 44 | 43 |
| Tensile strength (psi) | 1550 | 2230 | 2500 | 2470 |
| Elongation (%) | 120 | 177 | 220 | 230 |
| Modulus 100% (psi) | 1570 | 1935 | 1975 | 1915 |
| Tension set (%) | Fail | 40 | 43 | 48 |
| Oil swell (%) | 60 | 61 | 60 | 60 |
| Compression set (%) | 60 | 62 | 60 | 60 |

[1]Capron ® 8202 (Allied Signal)
[2]DVA #1 from Example 1
[3]80/20 interpolymer of Nylon 6/Polybond ® maleic anhydride modified polypropylene (Uniroyal Chemical Co.)

The compositions of the invention (G, H and I) demonstrate the importance of the compatibilizer in obtaining the unexpectedly improved tensile strength and elongation properties.

EXAMPLE 4

Compositions were prepared with various compatibilizers using the general method described above. Compatibilizers consisting of interpolymers of nylon and maleic anhydride modified polypropylene at different ratios, and interpolymers of nylon and a brominated copolymer of isobutylene and para-methylstyrene, were compared. Physical properties of the finished compositions were determined and are set forth in Table IV.

TABLE IV

|  | J | K | L |
|---|---|---|---|
| Nylon 6[1] (grams) | 10 | 10 | 10 |
| DVA[2] (grams) | 40 | 40 | 40 |
| Compatibilizer 1[3] (grams) | 10 | — | — |
| Compatibilizer 2[4] | — | 10 | — |
| Compatibilizer 3[5] | — | — | 10 |
| Plasticizer[6] (grams) | 8 | 8 | 8 |
| Hardness (Shore D) | 39 | 39 | 40 |
| Tensile strength (psi) | 2430 | 2460 | 1450 |
| Elongation (%) | 320 | 310 | 160 |
| Modulus 100% (psi) | 1530 | 1570 | 1430 |
| Tension set (%) | 38 | 32 | 30 |
| Oil swell (%) | 57 | 47 | 72 |
| Compression set (%) | 57 | 57 | 53 |

[1]Capron ® 8202 (Allied Signal)
[2]DVA #1 from Example 1
[3]60/40 interpolymer of Nylon 6/Polybond ® maleic anhydride modified polypropylene (Uniroyal Chemical Co.)
[4]80/20 interpolymer of Nylon 6/Polybond ® maleic anhydride modified polypropylene (Uniroyal Chemical Co.)
[5]Interpolymer of Nylon 6/brominated copolymer of isobutylene and para-methylstyrene (Exxpro ™, Exxon Chemical)
[6]Ketjenflex ® 8 (Akzo Chemie)

EXAMPLE 5

Compositions were prepared wherein ethylene-propylene-diene monomer (EPDM) rubber was the elastomer component of the DVA. The DVA was prepared as described above, with a formulation of 33.3 parts of polypropylene (PP D0008, Aristech Chemical), 100 parts of EPDM, and a cure system of 2 parts zinc oxide, 1.26 parts stannous chloride and 7 pans dimethylol-p-octyl phenol. DVA #3 was prepared using Vistalon®7000 EPDM (Exxon Chemical) and DVA #4 was prepared using Vistalon®4608 (Exxon Chemical). The compatibilized triblend compositions of the invention were prepared and physical properties are set forth in Table V.

TABLE V

|  | M | N | O |
|---|---|---|---|
| Nylon 6[1] (grams) | 10 | 10 | 10 |
| Compatibilizer[2] (grams) | 10 | 10 | 10 |
| DVA #1 (grams) | 40 | — | — |
| DVA #3 | — | 40 | — |
| DVA #4 | — | — | 40 |
| Hardness (Shore D) | 43 | 49 | 46 |
| Tensile strength (psi) | 2620 | 3020 | 2940 |
| Elongation (%) | 230 | 225 | 240 |
| Modulus 100% (psi) | 2060 | 2340 | 2180 |
| Tension set (%) | 48 | 60 | 40 |
| Oil swell (%) | 61 | 70 | 72 |
| Compression set (%) | 59 | 52 | 54 |

[1]Capron ® 8202 (Allied Signal)
[2]80/20 interpolymer of Nylon 6/Polybond ® maleic anhydride modified polypropylene (Uniroyal Chemical Co.)

While the best mode and preferred embodiment of the invention have been set forth in accord with the Patent Statutes, the scope of the invention is not limited thereto, but rather is defined by the claims which follow.

What is claimed is:

1. A thermoplastic elastomer composition comprising a blend of
   (a) from about 10 to about 50 parts by weight of a thermoplastic engineering resin;
   (b) from about 90 to about 50 parts by weight of a preformed alloy comprising a polyolefin matrix having dynamically vulcanized elastomer particles dispersed therein and comprising
      (i) a thermoplastic olefinic polymer, and
      (ii) an elastomeric copolymer having reactive cure sites; and
   (c) from about 2 to about 35 parts by weight of an interfacially active compatibilizer for (a) and (b).

2. The composition of claim 1 wherein the blend comprises from about 10 to about 40 pans by weight of (a), from about 60 to about 90 parts by weight of (b) and from about 2 to about 20 pans by weight of (c), based on the total weight of the blend.

3. The composition of claim 1 wherein the thermoplastic engineering resin (a) is selected from the group consisting of polyamides, polyesters and mixtures thereof.

4. The composition of claim 1 wherein the thermoplastic engineering resin (a) is selected from nylon and copolymers thereof.

5. The composition of claim 1 wherein the thermoplastic olefinic polymer (i) is selected from the group consisting of polyethylene, polypropylene and copolymers or mixtures thereof.

6. The composition of claim 1 wherein the thermoplastic olefinic polymer (i) is polypropylene.

7. The composition of claim 1 wherein the elastomeric copolymer (ii) is selected from the group consisting of a functionalized copolymer of a $C_{4-7}$ isomonoolefin and a para-alkylstyrene, EPDM rubber, or mixtures thereof.

8. The composition of claim 1 wherein the elastomeric copolymer (ii) is a halogenated copolymer of isobutylene and para-methylstyrene.

9. The composition of claim 1 wherein the elastomeric copolymer (ii) is EPDM rubber.

10. The composition of claim 1 wherein the dynamically vulcanized alloy (b) is fully vulcanized.

11. The composition of claim 1 wherein the dynamically vulcanized alloy (b) comprises from about 10 to about 90 weight percent of thermoplastic olefinic polymer (i) and from about 90 to about 10 weight percent of elastomeric copolymer (ii), based on the weight of (i) and (ii).

12. The composition of claim 1 wherein the compatibilizer (c) is a multi-functional compound having at least one segment which is compatible with the thermoplastic engineering resin (a) and incompatible with the alloy (b), and at least one segment which is compatible with the alloy (b) and incompatible with the thermoplastic engineering resin (a).

13. The composition of claim 1 wherein the compatibilizer (c) is the reaction product of a thermoplastic engineering resin and a maleated olefinic polymer.

14. The composition of claim 13 wherein the ratio of engineering resin to maleated olefin polymer ranges from about 95:5 to about 50:50.

15. A thermoplastic elastomer composition comprising a blend of
   (a) from about 10 to about 40 pans by weight of nylon;
   (b) from about 90 to about 60 parts by weight of a preformed alloy comprising a polyolefin matrix having dynamically fully vulcanized elastomer particles dispersed therein and comprising
      (i) from about 10 to about 50 weight percent of polypropylene, and
      (ii) from about 90 to about 50 weight percent of a halogenated copolymer of isobutylene and para-methylstyrene, based on the weight of (i) and (ii), and
   (c) from about 2 to about 20 parts by weight of the blend of an interfacially active compatibilizer for (a) and (b) comprising the reaction product of nylon and maleated polypropylene.

16. The composition of claim 1 in the form of a molded or extruded article.

17. The composition of claim 1 made by the steps of
   a) preparing a dynamically vulcanized alloy comprising a blend of thermoplastic olefinic polymer and an elastomeric copolymer having reactive cure sites;
   b) blending the alloy from step (a) with an engineering resin in the presence of a compatibilizer for the resin and alloy.

* * * * *